United States Patent
Li et al.

(10) Patent No.: US 12,444,313 B2
(45) Date of Patent: Oct. 14, 2025

(54) DETECTION METHOD AND SYSTEM FOR UNDERGROUND SPACE BY JOINT USE OF FIXED SENSOR AND UAV MOVEMENT DETECTION

(71) Applicant: Tongji University, Shanghai (CN)

(72) Inventors: Gang Li, Shanghai (CN); Bin He, Shanghai (CN); Runjie Shen, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 234 days.

(21) Appl. No.: 18/387,562

(22) Filed: Nov. 7, 2023

(65) Prior Publication Data
US 2024/0161638 A1  May 16, 2024

(30) Foreign Application Priority Data
Nov. 8, 2022  (CN) .......................... 202211391156.8

(51) Int. Cl.
| | |
|---|---|
| G08G 5/80 | (2025.01) |
| B64U 20/30 | (2023.01) |
| G01C 21/20 | (2006.01) |
| G08G 5/55 | (2025.01) |
| G08G 5/57 | (2025.01) |
| B64U 101/70 | (2023.01) |

(52) U.S. Cl.
CPC .............. *G08G 5/80* (2025.01); *B64U 20/30* (2023.01); *G01C 21/20* (2013.01); *G08G 5/55* (2025.01); *G08G 5/57* (2025.01); *B64U 2101/70* (2023.01)

(58) Field of Classification Search
CPC ... G08G 5/80; G08G 5/57; G08G 5/55; B64U 20/30; B64U 2101/70; G01C 21/20
See application file for complete search history.

(56) References Cited

FOREIGN PATENT DOCUMENTS

| | | | | |
|---|---|---|---|---|
| CN | 104254079 A | * | 12/2014 | |
| CN | 110703809 A | * | 1/2020 | ............... G05D 1/12 |
| EP | 2442133 A1 | * | 4/2012 | ............ G01S 13/933 |
| JP | 2019036269 A | * | 3/2019 | |

* cited by examiner

*Primary Examiner* — Hitesh Patel
*Assistant Examiner* — Reece Anthony Wakely
(74) *Attorney, Agent, or Firm* — TROUTMAN PEPPER LOCKE LLP; Christopher C. Close, Jr.

(57) ABSTRACT

The present disclosure relates to a detection method and system for an underground space by joint use of fixed sensors and unmanned aerial vehicle (UAV) movement detection. The detection system includes underground space sensor nodes and an underground space UAV. The underground space sensor nodes are configured to perform fixed monitoring based on an adaptive optimal layout strategy for an underground structural space. The underground space UAV is configured to calculate a first virtual force, and realize movement detection by means of a virtual force-guided path planning algorithm. The underground space UAV is configured to calculate the first virtual force based on the electronic telescopic anti-collision bars, a second virtual force based on a static perception probability and a third virtual force based on structural evolution knowledge, and realize a fixed node-guided UAV flight detection mode by means of the virtual force-guided path planning algorithm.

9 Claims, 9 Drawing Sheets

Top view

*Fig. 5A*

Side view

DETECTION METHOD AND SYSTEM FOR UNDERGROUND SPACE BY JOINT USE OF FIXED SENSOR AND UAV MOVEMENT DETECTION

CROSS REFERENCE TO RELATED APPLICATION

This patent application claims the benefit and priority of Chinese Patent Application No. 202211391156.8, filed with the China National Intellectual Property Administration on Nov. 8, 2022, the disclosure of which is incorporated by reference herein in its entirety as part of the present application.

TECHNICAL FIELD

The present disclosure relates to the technical field of underground space detection, and in particular, to a detection method and system for an underground space by joint use of fixed sensors and unmanned aerial vehicle (UAV) movement detection.

BACKGROUND

Underground space infrastructure features an ultra-long linear structure, a closed environment, a long service time, difficulty in communication, many uncertain risk factors, and the like. A detection method relying solely on deployment of fixed sensors has shortcomings such as limited coverage, a high missed detection rate, and difficulty in maintenance, which can no longer meet requirements for infrastructure service state detection. An intelligent unmanned system such as an inspection UAV can make up for the shortage of a grid of fixed sensors in time and space by means of a movement detection technology, which has become an important development direction to meet the challenge of infrastructure detection. Therefore, it is an important research direction in the field of structural monitoring to realize structural health monitoring by using various intelligent sensors and intelligent unmanned systems.

Multi-sensor nodes and the unmanned system interactively collect data via a communication network, thus constructing a "data map" of structural state parameters. Currently, relevant researchers at home and abroad have performed relevant research from three aspects: multi-agent cooperative detection, data fusion, and target cognition, which can improve the multi-agent monitoring ability to some extent. However, research results of the three aspects are relatively isolated, lack of relevance, and have weak mutual guidance.

SUMMARY

Embodiments of the present disclosure provide a detection method and system for an underground space by joint use of fixed sensors and UAV movement detection. The technical solutions are as follows:

In a first aspect, a detection method for an underground space by joint use of fixed sensors and UAV movement detection is provided. The method is implemented by an electronic device.

The method is implemented by a detection system for an underground space by joint use of fixed sensors and UAV movement detection, and the detection system for an underground space by joint use of fixed sensors and UAV movement detection includes underground space sensor nodes and an underground space UAV.

The method includes:
collecting data by the underground space sensor nodes to obtain data of fixed sensors, using a fixed monitoring mode for the underground space based on the data of the fixed sensors, and calculating a sensor perception probability;
performing, by the underground space UAV, communication operation of a mobile/fixed star topology on one or more sensor nodes to determine a communication result; and
when the communication result is a failure, reading, by the underground space UAV, a counter for electronic telescopic anti-collision bars of the UAV to obtain a distance between the UAV and an inner wall of the underground space, calculating, by the underground space UAV, a first virtual force based on the distance between the UAV and the inner wall of the underground space, inputting the first virtual force into a virtual force-guided path planning algorithm to obtain a first output result, and using, by the underground space UAV, a movement detection mode for the underground space based on the first output result; when the communication result is a success, reading, by the underground space UAV, the counter for the electronic telescopic anti-collision bars of the UAV to obtain the distance between the UAV and the inner wall of the underground space, calculating, by the underground space UAV, the first virtual force based on the distance between the UAV and the inner wall of the underground space, calculating a second virtual force based on the sensor perception probability, aggregating the data of the fixed sensors to obtain structural spatiotemporal evolution knowledge (SSK), and calculating a third virtual force based on the SSK; and inputting the first virtual force, the second virtual force and the third virtual force into the virtual force-guided path planning algorithm to obtain a second output result, and using, by the underground space UAV, a fixed node-guided UAV flight detection mode for the underground space based on the second output result.

Optionally, the underground space sensor nodes use an adaptive optimal layout strategy for an underground structural space to design perception regions, and establish an optimal coverage objective function of the underground structural space to realize multi-sensor adaptive optimal layout for the underground structural space.

Optionally, the sensor perception probability is an output result after sensor position information is input into a static multi-sensor perception probability model established based on a perception space disk criterion, the sensor perception probability being 1 indicates that a distance between a position of a fixed node of a sensor and a position of a monitoring point is 0, and the sensor perception probability gradually decreases as the distance between the monitoring point and the sensor increases; the perception disk criterion is a static multi-sensor perception region analysis method based on perception characteristics of distributed sensors to analyze overlap, contact, and separation between multiple perception regions, and a formula for calculating the sensor perception probability is shown in formula (1) as follows:

$$\begin{cases} S(s, p) = 1/[1 + \alpha d(s, p)]^\beta & \text{if } d(s, p) \leq r \\ S(s, p) = 0 & \text{if } d(s, p) > r \end{cases} \quad (1)$$

where S(s,p) represents a calculated perception probability of a sensor s at a point p, d(s,p) represents a distance between the sensor s and the point p, α and β are device parameters representing physical characteristics of the sensor, and r is a perception radius of the sensor.

Optionally, the first virtual force is a repulsive force $F_{w\text{-}v}$ of the inner wall of the underground space to the underground space UAV, and a formula for calculating the first virtual force is shown in formula (2) as follows:

$$F_{w-v} = \frac{\delta}{[d(v, w)]^2}, \quad (2)$$

where δ is a coefficient of a virtual repulsive force Fw-v, d(v,w) means the distance between the UAV and the inner wall of the underground space, and d(v,w) is read based on the electronic telescopic anti-collision bars.

Optionally, the second virtual force is a virtual repulsive force $F_{s\text{-}v}$ based on a static perception probability, a higher static perception probability indicates a greater virtual repulsive force, a direction of the second virtual force $F_{s\text{-}v}$ points from the position of the fixed node of the sensor to a position of a moving point, and a formula for calculating the second virtual force is shown in formula (3) as follows:

$$\begin{cases} F_{s-v} = \frac{\phi_r}{[1 + \alpha d(s, v)]^\beta}, & \text{if } d(s, v) \le r \\ 0, & \text{if } d(s, v) > r \end{cases} \quad (3)$$

where $\varphi_r$ is a virtual repulsive force coefficient $F_{s\text{-}v}$, d(s,v) represents a distance between the fixed sensor s and a mobile node v, α and β are device parameters representing physical characteristics of the sensor, and r is a perception radius of the sensor.

Optionally, the third virtual force is a virtual gravitational force $F_{k\text{-}v}$ based on the SSK, and a formula for calculating the third virtual force is shown in formula (4) as follows:

$$F_{k-v} = f(\text{SSK}) \quad (4).$$

Optionally, the mobile/fixed star topology is formed with the underground space UAV as a central node and underground space sensors as sub-nodes; and the performing, by the underground space UAV, communication operation of a mobile/fixed star topology on one or more sensor nodes includes:

communicating in a ZigBee low-power wireless communication mode, recording, when the underground space UAV receives a connection requirement, a number of a currently connected node, breaking away from an original topology, switching to the mobile/fixed star topology, and performing self-organizing connection with a sensor clustering self-organizing network; and when the underground space UAV communication connection is unsuccessful, waiting for a next monitoring cycle to continue sending a connection application until the connection is successful.

Optionally, the method further includes:

implementing, by the underground space UAV, three types of underground space collision avoidance flights based on task-oriented path planning and the virtual force-guided path planning algorithm, where the three types of underground space collision avoidance flights include passive collision avoidance, active collision avoidance, and active/passive collision avoidance, where the passive collision avoidance is guided by the underground space UAV based on the first virtual force, the active collision avoidance is guided by the underground space UAV based on the second virtual force and the third virtual force, and the active/passive collision avoidance is guided by the underground space UAV based on the first virtual force, the second virtual force, and the third virtual force; and the virtual force-guided path planning algorithm is an algorithm for calculating a magnitude and direction of a virtual resultant force on the underground space UAV based on the designed first virtual force, second virtual force and third virtual force, to obtain a global virtual force distribution when the underground space UAV moves in the underground space.

Optionally, the aggregating the data of the fixed sensors to obtain SSK includes:

S91: when there are sensor nodes in a communication distance range of the underground space UAV, aggregating, by the underground space UAV, data of each sensor node based on the mobile/fixed star topology to obtain an original perception data set S;

S92: aligning the multi-sensor node data in time and space, analyzing spatial-temporal correlation of the multi-source data, and establishing a sparse representation of the multi-source perception data;

S93: introducing a time observation matrix $\Phi_t$ and a space observation matrix $\Phi_s$ to fuse the original perception data set S, $S = \Psi_t X \Psi_s^T$, $Y = \Phi_t S \Phi_s^T$, where $\Psi_t \Psi_t \in R^{Q \times W}$ is a temporal sparse dictionary, $\Psi_s \Psi_s \in R^{N \times N}$ is a spatial sparse dictionary, and $XX \in R^{W \times N}$ is a sparse coefficient matrix; and obtaining, by the underground space UAV, an observation output matrix $YY \in R^{P \times M}$ by means of the time observation matrix $\Phi_t$ and the space observation matrix $\Phi_s$;

S94: selecting a reasonable time observation matrix $\Phi_t$ and space observation matrix $\Phi_s$; to minimize sparsity, and training the temporal sparse dictionary $\Psi_t$ and the space observation matrix $\Psi_s$ by using a K-means singular value decomposition (KSVD) method, to obtain the most suitable time observation matrix $\Phi_t$ and space observation matrix $\Phi_s$;

S95: letting $S_t = \Psi_t X$, and training a target temporal sparse dictionary $\widehat{\Psi}_t$, with a training target function shown in formula (5) as follows:

$$\min \|S_t - \widehat{\Psi}_t X\|_F^2, \text{s.t.} \|x_i\|_0 \le k, \; i = 1, 2, \ldots, N \quad (5), \text{ and}$$

updating each column of the temporal sparse dictionary, where the updated $i^{th}$ column is expressed as $\widehat{\psi}_{t_i}$, $i = 1, 2, \ldots, W$, and W is a number of columns of the temporal sparse dictionary, with a formula shown in formula (6) as follows:

$$\|S_t - \widehat{\Psi}_t X\|_F^2 = \|S_t - \Sigma_{j=1}^W \widehat{\psi}_{t_j} x_j^T\|_F^2 = \|S_t - \Sigma_{j \ne i} \widehat{\psi}_{t_j} x_j^T - \widehat{\psi}_{t_i} x_i^T\|_F^2 = \|Z_t - \widehat{\psi}_{t_i} x_i^T\|_F^2 \quad (6); \text{ and}$$

S96: fusing an updated temporal sparse dictionary with the original data set to obtain a fusion result which is the SSK.

In another aspect, a detection system for an underground space by joint use of fixed sensors and UAV movement detection is provided. The system is applied to implement a detection method for an underground space by joint use of fixed sensors and UAV movement detection. The detection system for an underground space by joint use of fixed sensors and UAV movement detection includes underground space sensor nodes and an underground space UAV.

The underground space sensor nodes are configured to collect data to obtain data of fixed sensors, use a fixed monitoring mode for the underground space based on the data of the fixed sensors, and calculate a sensor perception probability.

The underground space UAV is configured to perform communication operation of a mobile/fixed star topology on one or more underground space sensor nodes in the underground space to determine a communication result; when the communication result is a failure, the underground space UAV is configured to obtain a first virtual force based on reading of data of a counter for electronic telescopic anti-collision bars of the UAV, and input the first virtual force into a virtual force-guided path planning algorithm to obtain a first output result, and the underground space UAV is configured to use a movement detection mode for the underground space based on the first output result; when the communication result is a success, the underground space UAV is configured to obtain the first virtual force based on the reading of the data of the counter for the electronic telescopic anti-collision bars of the UAV, calculate a second virtual force based on the sensor perception probability, aggregate the data of the fixed sensors to obtain SSK, and calculate a third virtual force based on the SSK; and the first virtual force, the second virtual force and the third virtual force are input into the virtual force-guided path planning algorithm to obtain a second output result, and the underground space UAV is configured to use a fixed node-guided UAV flight detection mode for the underground space based on the second output result.

Optionally, the underground space sensor nodes are further configured to
use an adaptive optimal layout strategy for an underground structural space to design perception regions, and establish an optimal coverage objective function of the underground structural space to realize multi-sensor adaptive optimal layout for the underground structural space.

Optionally, the underground space sensor nodes are further configured for the following:
the sensor perception probability is an output result after sensor position information is input into a static multi-sensor perception probability model established based on a perception space disk criterion, the sensor perception probability being 1 indicates that a distance between a position of a fixed node of a sensor and a position of a monitoring point is 0, and the sensor perception probability gradually decreases as the distance between the monitoring point and the sensor increases; the perception disk criterion is a static multi-sensor perception region analysis method based on perception characteristics of distributed sensors to analyze overlap, contact, and separation between multiple perception regions, and a formula for calculating the sensor perception probability is shown in formula (1) as follows:

$$\begin{cases} S(s, p) = 1/[1 + \alpha d(s, p)]^\beta & \text{if } d(s, p) \le r \\ S(s, p) = 0 & \text{if } d(s, p) > r \end{cases} \quad (1)$$

where $S(s,p)$ represents a calculated perception probability of a sensor s at a point p, $d(s,p)$ represents a distance between the sensor s and the point p, $\alpha$ and $\beta$ are device parameters representing physical characteristics of the sensor, and r is a perception radius of the sensor.

Optionally, the underground space UAV is further configured for the following:
the first virtual force is a repulsive force $F_{w-v}$ of the inner wall of the underground space to the underground space UAV, and a formula for calculating the first virtual force is shown in formula (2) as follows:

$$F_{w-v} = \frac{\delta}{[d(v, w)]^2}, \quad (2)$$

where $\delta$ is a coefficient of a virtual repulsive force Fw-v, $d(v,w)$ means the distance between the UAV and the inner wall of the underground space, and $d(v,w)$ is read based on the electronic telescopic anti-collision bars.

Optionally, the underground space UAV is further configured for the following:
the second virtual force is a virtual repulsive force $F_{s-v}$ based on a static perception probability, a higher static perception probability indicates a greater virtual repulsive force, a direction of the second virtual force $F_{s-v}$ points from the position of the fixed node of the sensor to a position of a moving point, and a formula for calculating the second virtual force is shown in formula (3) as follows:

$$\begin{cases} F_{s-v} = \frac{\phi_r}{[1 + \alpha d(s, v)]^\beta}, & \text{if } d(s, v) \le r \\ 0, & \text{if } d(s, v) > r \end{cases}, \quad (3)$$

where $\phi_r$ is a virtual repulsive force coefficient $F_{s-v}$, $d(s,v)$ represents a distance between the fixed sensor s and a mobile node v, $\alpha$ and $\beta$ are device parameters representing physical characteristics of the sensor, and r is a perception radius of the sensor.

Optionally, the underground space UAV is further configured for the following:
the third virtual force is a virtual gravitational force $F_{k-v}$ based on the SSK, and a formula for calculating the third virtual force is shown in formula (4) as follows:

$$F_{k-v} = f(SSK) \quad (4).$$

Optionally, the underground space UAV is further configured for the following:
the mobile/fixed star topology is formed with the underground space UAV as a central node and underground space sensors as sub-nodes; and
the performing, by the underground space UAV, communication operation of a mobile/fixed star topology on one or more sensor nodes includes:
communicating in a ZigBee low-power wireless communication mode, recording, when the underground space UAV receives a connection requirement, a number of a currently connected node, breaking away from an original topology, switching to the mobile/fixed star topology, and performing self-organizing connection with a sensor clustering self-organizing network; and when the underground space UAV communication connection is unsuccessful, waiting for a next monitoring cycle to continue sending a connection application until the connection is successful.

Optionally, the underground space UAV is further configured to implement three types of underground space collision avoidance flights based on task-oriented path planning and the virtual force-guided path planning algorithm, where the three types of underground space collision avoidance flights include passive collision avoidance, active collision avoidance, and active/passive collision avoidance, where the passive collision avoidance is guided by the underground space UAV based on the first virtual force, the active collision avoidance is guided by the underground space UAV based on the second virtual force and the third virtual force, and the active/passive collision avoidance is guided by the underground space UAV based on the first virtual force, the second virtual force, and the third virtual force; and the virtual force-guided path planning algorithm is an algorithm for calculating a magnitude and direction of a virtual resultant force on the underground space UAV based on the designed first virtual force, second virtual force and third virtual force, to obtain a global virtual force distribution when the underground space UAV moves in the underground space.

Optionally, the underground space UAV is further configured to aggregate the data of the fixed sensors to obtain SSK, including:

S91: when there are sensor nodes in a communication distance range of the underground space UAV, aggregating, by the underground space UAV, data of each sensor node based on the mobile/fixed star topology to obtain an original perception data set S;

S92: aligning the multi-sensor node data in time and space, analyzing spatial-temporal correlation of the multi-source data, and establishing a sparse representation of the multi-source perception data;

S93: introducing a time observation matrix $\Phi_t$ and a space observation matrix $\Phi_s$ to fuse the original perception data set S. $S = \Psi_t X \Psi_s^T$, $Y = \Phi_t S \Phi_s^T$, where $\Psi_t, \Psi_t \in R^{Q \times W}$ is a temporal sparse dictionary, $\Psi_s, \Psi_s \in R^{N \times N}$ is a spatial sparse dictionary, and $XX \in R^{W \times N}$ is a sparse coefficient matrix; and obtaining, by the underground space UAV, an observation output matrix $YY \in R^{P \times M}$ by means of the time observation matrix $\Phi_t$ and the space observation matrix $\Phi_s$;

S94: selecting a reasonable time observation matrix $\Phi_t$ and space observation matrix $\Phi_s$ to minimize sparsity, and training the temporal sparse dictionary $\Psi_t$ and the space observation matrix $\Psi_s$ by using a K-means singular value decomposition (KSVD) method, to obtain the most suitable time observation matrix $\Phi_t$ and space observation matrix $\Phi_s$;

S95: letting $S_t = \Psi_t X$, and training a target temporal sparse dictionary $\hat{\Psi}_t$, with a training target function shown in formula (5) as follows:

$$\min \|S_t - \hat{\Psi}_t X\|_F^2, s.t. \|x_i\|_0 \leq k, \ i=1,2,\ldots,N \quad (5), \text{ and}$$

updating each column of the temporal sparse dictionary, where the updated $i^{th}$ column is expressed as $\widehat{\psi_{t_i}}$, $i=1, 2, \ldots, W$, and W is a number of columns of the temporal sparse dictionary, with a formula shown in formula (6) as follows:

$$\|S_t - \hat{\Psi}_t X\|_F^2 = \|S_t - \Sigma_{j=1}^{W} \widehat{\psi}_{t_j} x_j^T\|_F^2 = \|S_t - \Sigma_{j \neq i} \widehat{\psi}_{t_j} x_j^T - \widehat{\psi}_{t_i} x_i^T\|_F^2 = \|Z_i - \widehat{\psi}_{t_i} x_i^T\|_F^2 \quad (6); \text{ and}$$

S96: fusing an updated temporal sparse dictionary with the original data set to obtain a fusion result which is the SSK.

In another aspect, an electronic device is provided. The electronic device includes a processor and a memory. At least one instruction is stored in the memory. The at least one instruction is loaded and executed by the processor to implement the detection method for an underground space by joint use of fixed sensors and UAV movement detection described above.

In a further aspect, a computer-readable storage medium is provided. At least one instruction is stored in the storage medium. The at least one instruction is loaded and executed by a processor to implement the detection method for an underground space by joint use of fixed sensors and UAV movement detection described above.

Technical solutions provided in the embodiments of the present disclosure achieve at least the following beneficial effects:

The present disclosure provides the detection method for an underground space by joint use of fixed sensors and UAV movement detection, which makes up for the limitation on a space perceived by fixed sensors through movement and autonomous detection of the UAV, and correlates research results in terms of multi-agent cooperative detection, data fusion and target cognition through mutual guidance, collaboration and fusion of the fixed sensors and the UAV, thus improving the multi-sensor detection capability to a certain extent and realizing efficient detection of the underground space by joint use of fixed sensors and UAV movement detection.

BRIEF DESCRIPTION OF THE DRAWINGS

In order to describe the technical solutions in the embodiments of the present disclosure more clearly, the accompanying drawings required to describe the embodiments are briefly described below. Apparently, the accompanying drawings described below show only some embodiments of the present disclosure. Those of ordinary skill in the art may further obtain other accompanying drawings based on these accompanying drawings without creative efforts.

DETAILED DESCRIPTION OF THE EMBODIMENTS

To make the to-be-solved technical problems, technical solutions, and advantages of the present disclosure clearer, the present disclosure will be described in detail below with reference to the accompanying drawings and specific embodiments.

Figure 1:
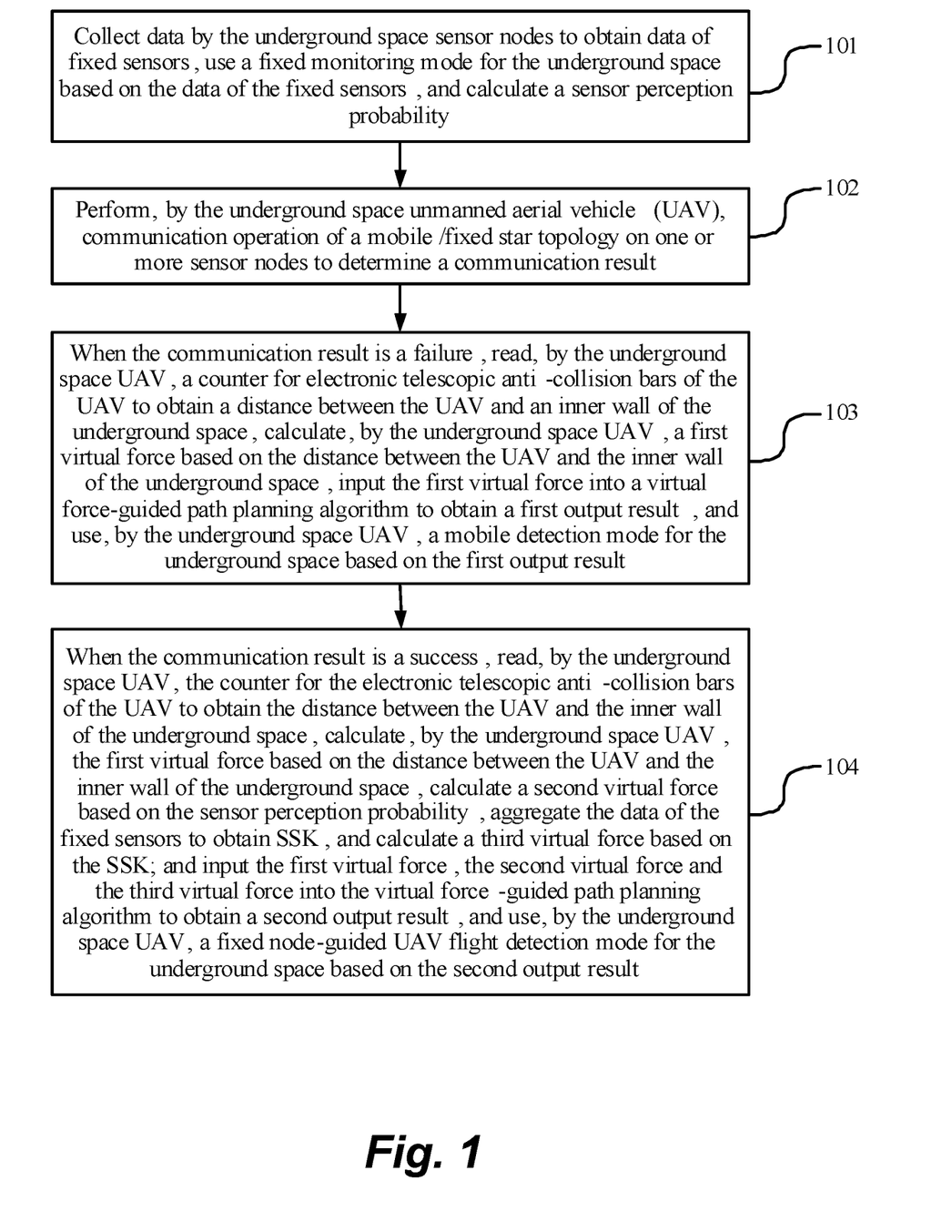
FIG. 1 is a flowchart of a detection method for an underground space by joint use of fixed sensors and UAV movement detection according to an embodiment of the present disclosure.

An embodiment of the present disclosure provides a detection method for an underground space by joint use of fixed sensors and UAV movement detection. The method may be implemented by an electronic device, and the electronic device may be a terminal or a server. FIG. 1 is a flowchart of a detection method for an underground space by joint use of fixed sensors and UAV movement detection. A processing flow of the method may include the following steps.

S101: Collect data by the underground space sensor nodes to obtain data of fixed sensors, use a fixed monitoring mode for the underground space based on the data of the fixed sensors, and calculate a sensor perception probability.

The underground space sensor nodes use an adaptive optimal layout strategy for an underground structural space to design perception regions, and establish an optimal coverage objective function of the underground structural space to realize multi-sensor adaptive optimal layout for the underground structural space.

Optionally, the sensor perception probability is an output result after sensor position information is input into a static multi-sensor perception probability model established based on a perception space disk criterion, the sensor perception probability being 1 indicates that a distance between a position of a fixed node of a sensor and a position of a monitoring point is 0, and the sensor perception probability gradually decreases as the distance between the monitoring point and the sensor increases; the perception disk criterion is a static multi-sensor perception region analysis method based on perception characteristics of distributed sensors to analyze overlap, contact, and separation between multiple perception regions, and a formula for calculating the sensor perception probability is shown in formula (1) as follows:

$$\begin{cases} S(s, p) = 1/[1 + \alpha d(s, p)]^\beta & \text{if } d(s, p) \le r \\ S(s, p) = 0 & \text{if } d(s, p) > r \end{cases} \quad (1)$$

where S(s,p) represents a calculated perception probability of a sensor s at a point p, d(s,p) represents a distance between the sensor s and the point p, α and β are device parameters representing physical characteristics of the sensor, and r is a perception radius of the sensor.

The point s where the sensor is located is the position of the sensor referred to during calculation, and the monitoring point p is a monitored position within the monitoring range of the sensor during fixed monitoring.

S102: Perform, by the underground space UAV, communication operation of a mobile/fixed star topology on one or more sensor nodes to determine a communication result.

Figure 2:
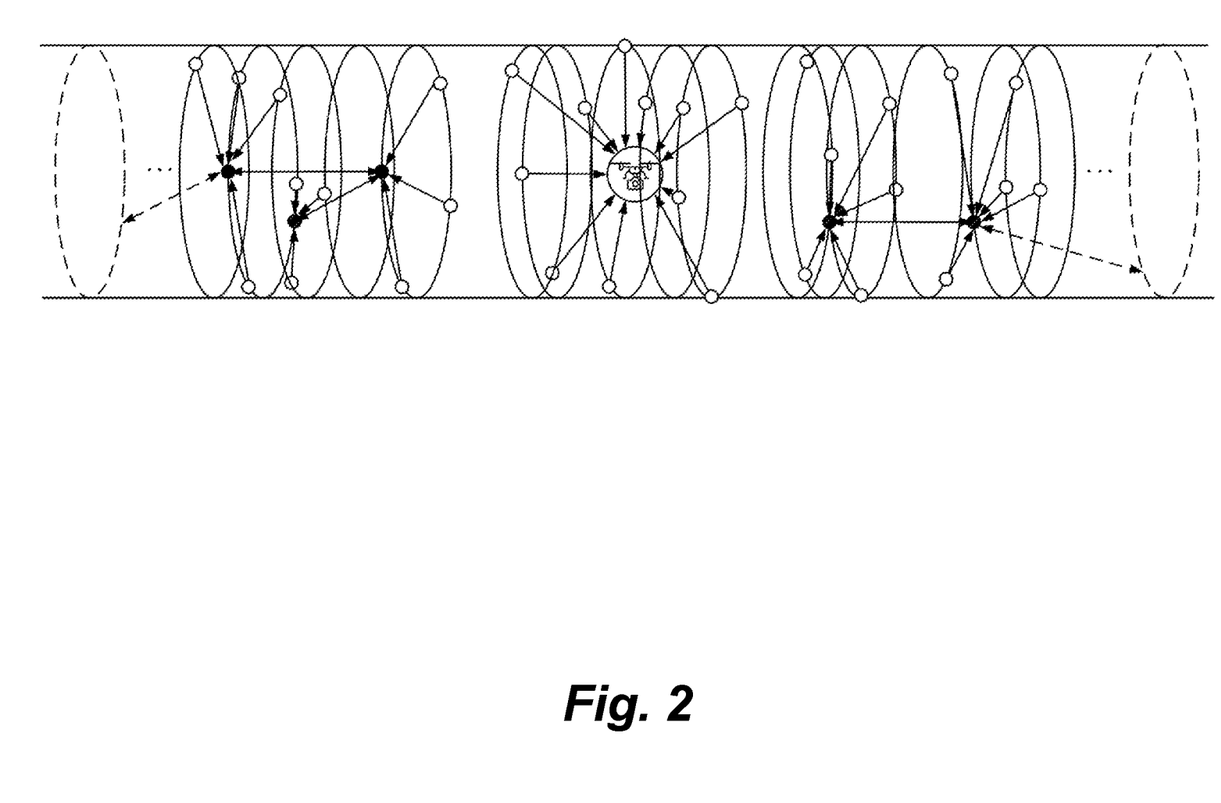
FIG. 2 is a diagram of a mobile/fixed star topology according to an embodiment of the present disclosure.

The mobile/fixed star topology shown in FIG. 2 is formed with the underground space UAV as a central node and underground space sensors as sub-nodes; and the performing, by the underground space UAV, communication operation of a mobile/fixed star topology on one or more sensor nodes includes:

communicating in a ZigBee low-power wireless communication mode, recording, when the underground space UAV receives a connection requirement, a number of a currently connected node, breaking away from an original topology, switching to the mobile/fixed star topology, and performing self-organizing connection with a sensor clustering self-organizing network; and when the underground space UAV communication connection is unsuccessful, waiting for a next monitoring cycle to continue sending a connection application until the connection is successful.

Figure 3:
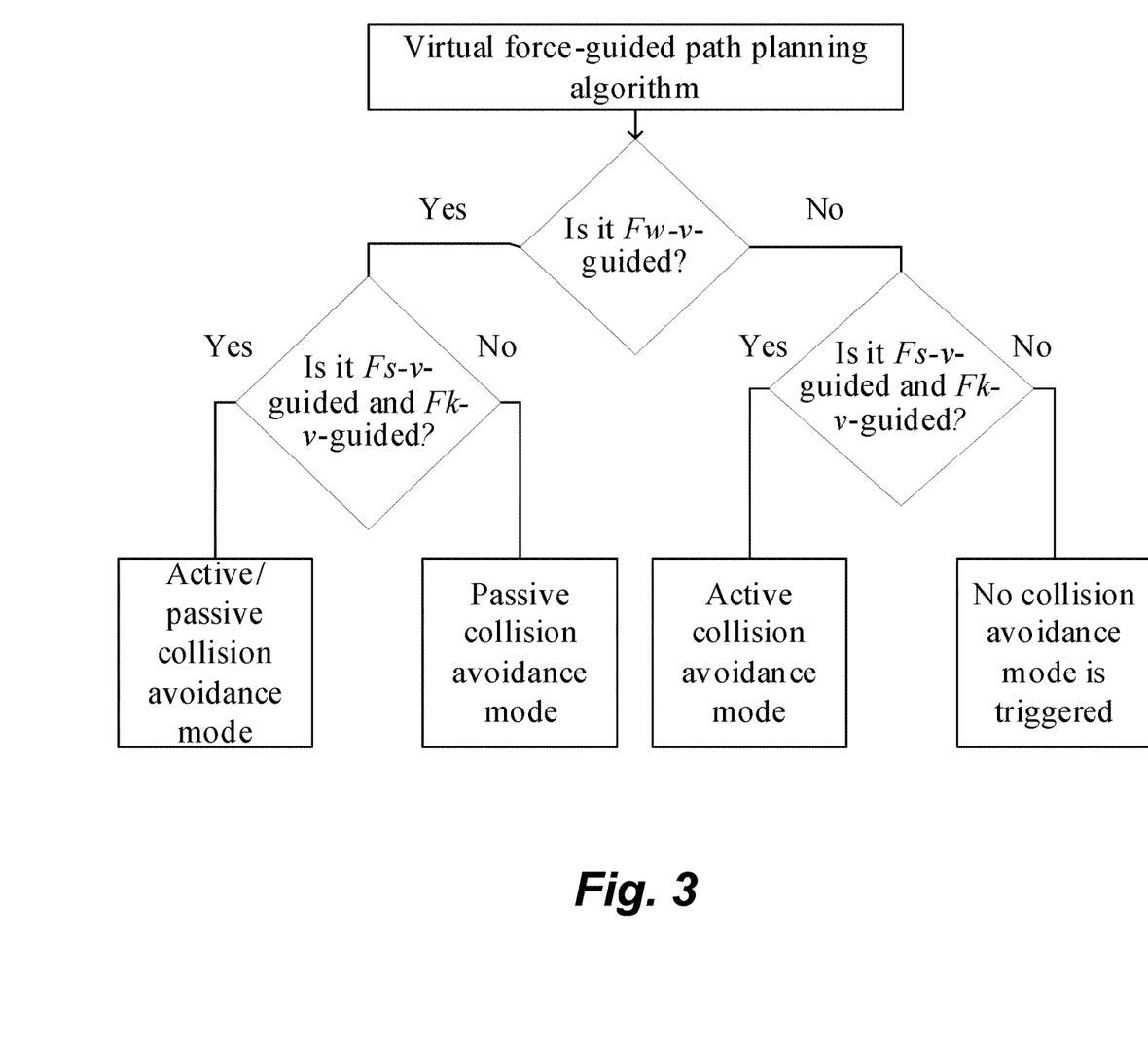
FIG. 3 is a schematic diagram of a virtual force-guided collision avoidance mode according to an embodiment of the present disclosure.

Optionally, the detection method for an underground space by joint use of fixed sensors and UAV movement detection may further include:

as shown in FIG. 3, implementing three types of underground space collision avoidance flights based on task-oriented path planning and the virtual force-guided path planning algorithm, where the three types of underground space collision avoidance flights include passive collision avoidance, active collision avoidance, and active/passive collision avoidance, where the passive collision avoidance is guided by the underground space UAV based on the first virtual force, the active collision avoidance is guided by the underground space UAV based on the second virtual force and the third virtual force, and the active/passive collision avoidance is guided by the underground space UAV based on the first virtual force, the second virtual force, and the third virtual force; and the virtual force-guided path planning algorithm is an algorithm for calculating a magnitude and direction of a virtual resultant force on the underground space UAV based on the designed first virtual force, second virtual force and third virtual force, to obtain a global virtual force distribution when the underground space UAV moves in the underground space.

Figure 4:
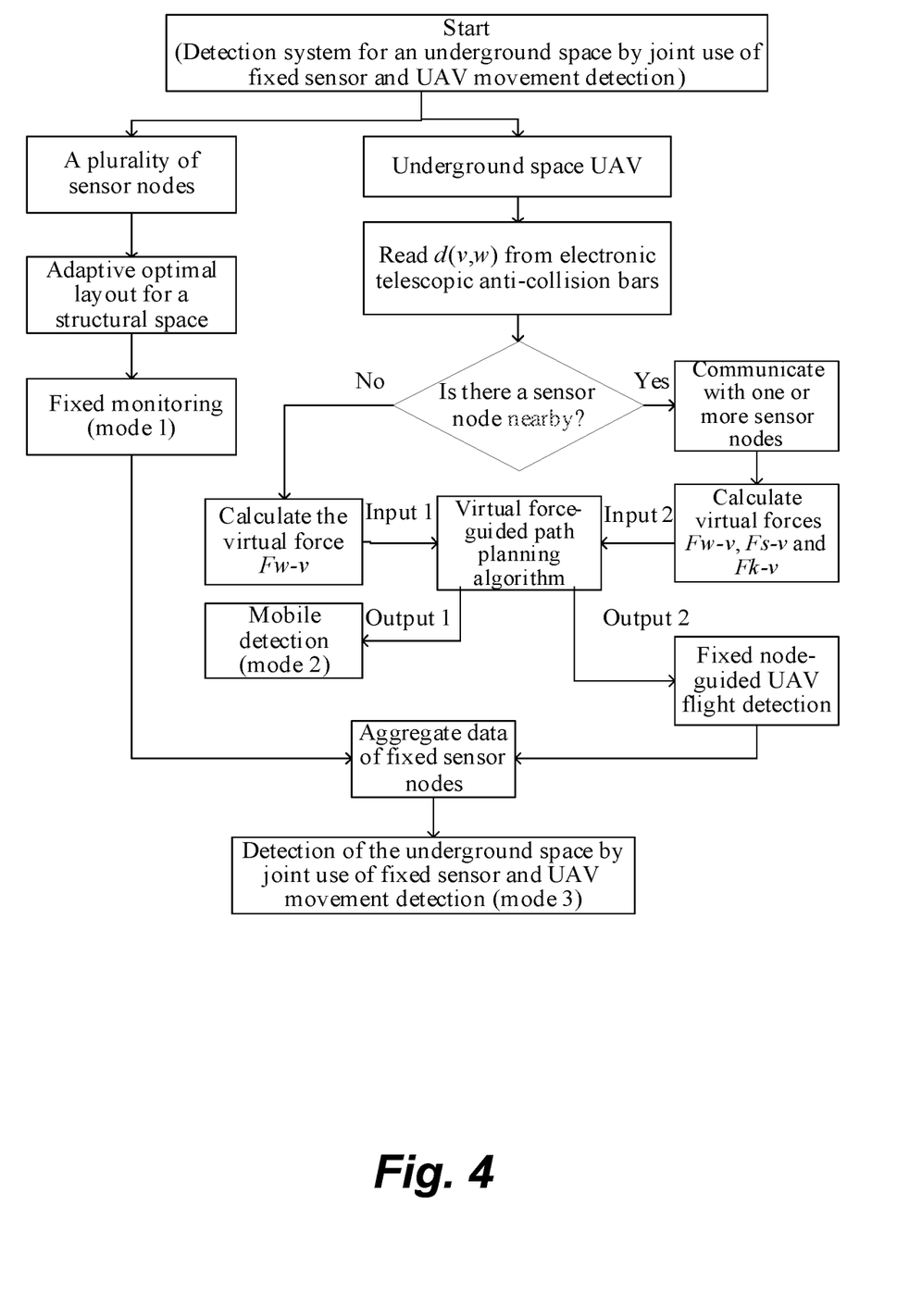
FIG. 4 is a flowchart of detection of an underground space by joint use of fixed sensors and UAV movement detection according to an embodiment of the present disclosure.

S103: As shown in FIG. 4, when the communication result is a failure, read, by the underground space UAV, a counter for electronic telescopic anti-collision bars of the UAV to obtain a distance between the UAV and an inner wall of the underground space, calculate, by the underground space UAV, a first virtual force based on the distance between the UAV and the inner wall of the underground space, input the first virtual force into a virtual force-guided path planning algorithm to obtain a first output result, and use, by the underground space UAV, a movement detection mode for the underground space based on the first output result.

Figure 5A:
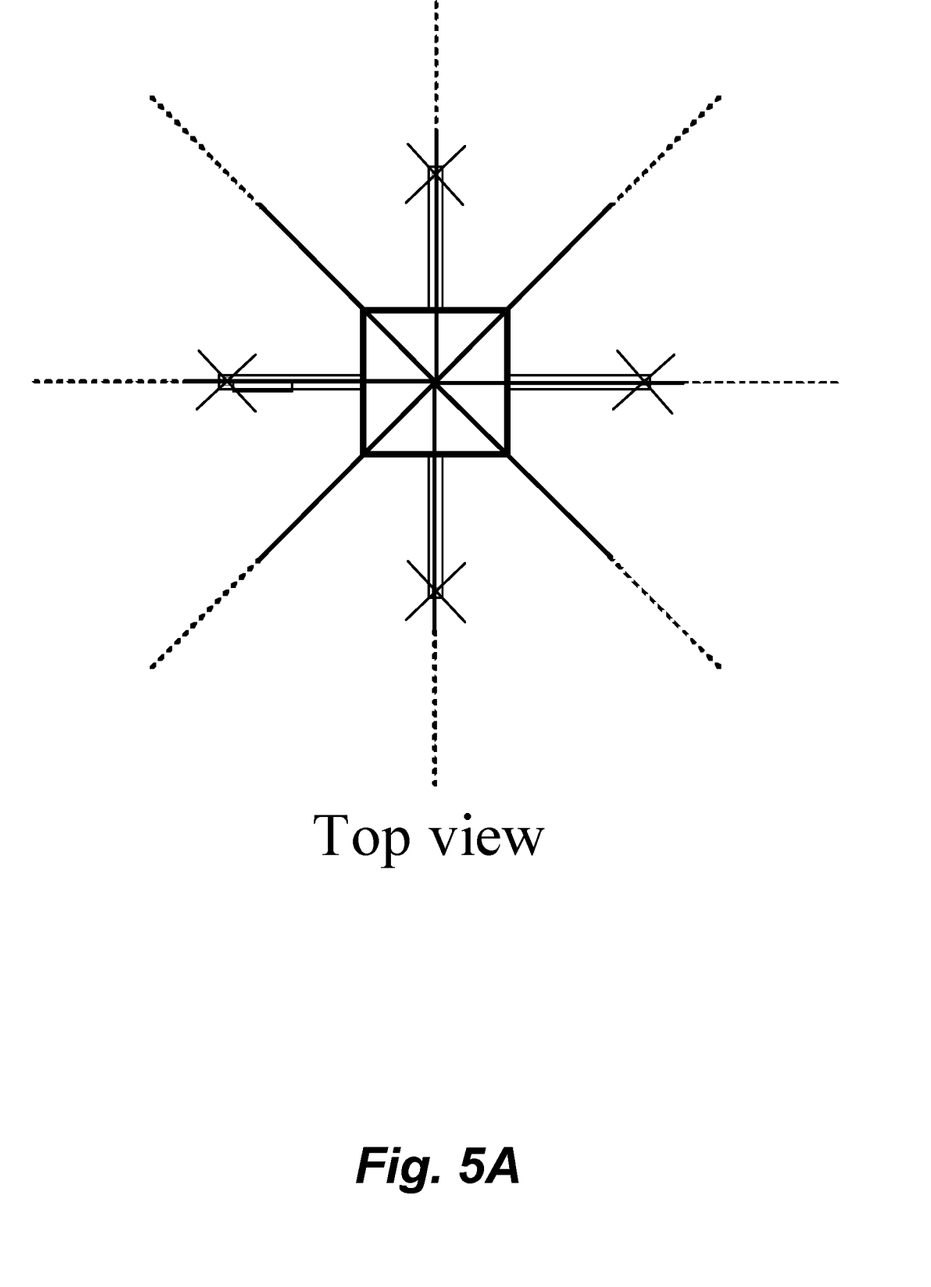
FIGS. 5A-B are schematic diagrams showing mounting of an electronic telescopic anti-collision bar of a UAV according to an embodiment of the present disclosure.
Figure 5B:
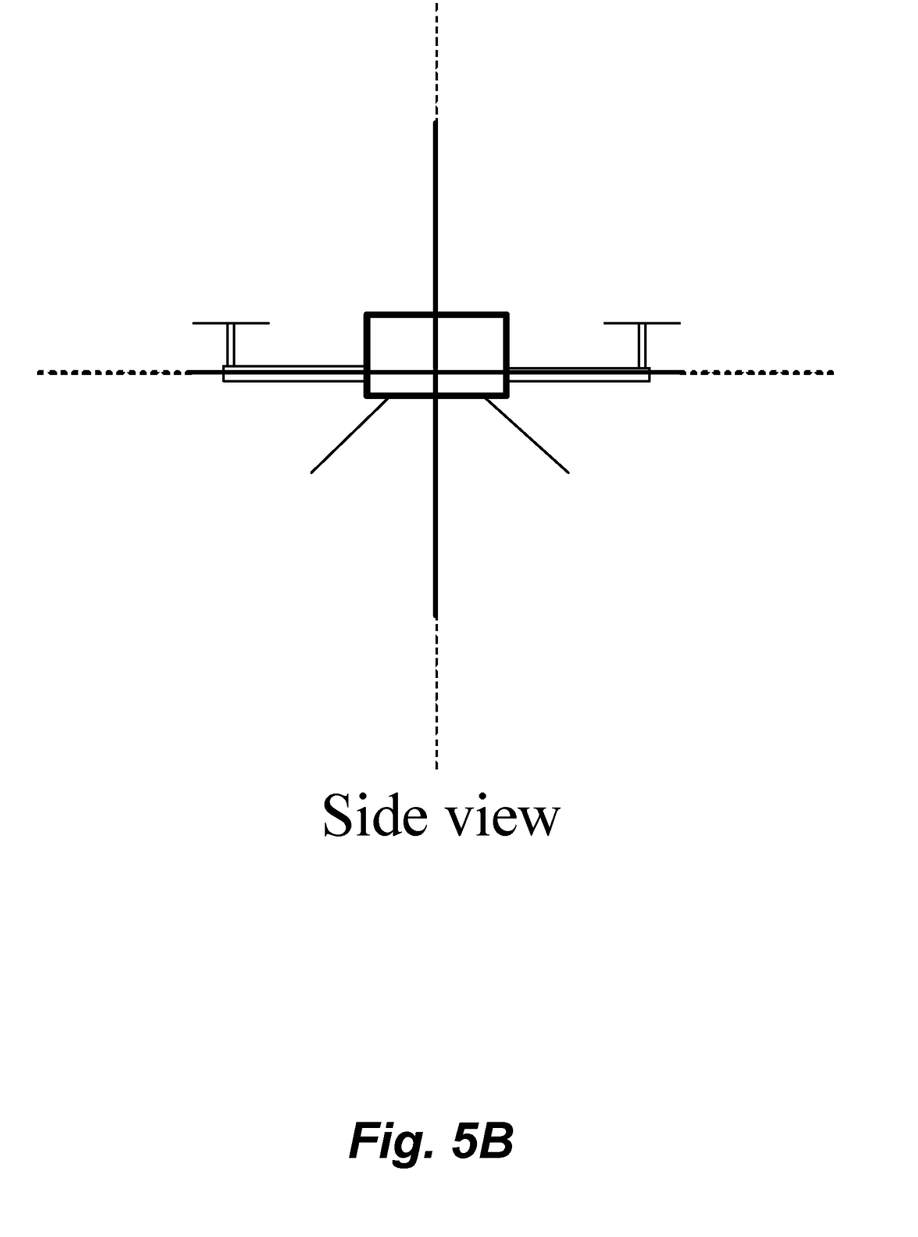

As shown in FIGS. 5A-B, the counter for the electronic telescopic anti-collision bars is mounted on a fuselage of the UAV. Eight electronic telescopic anti-collision bars are evenly distributed on an X-Y plane and two electronic telescopic anti-collision bars are distributed on a Z axis, and a total of 10 electronic telescopic anti-collision bars are mounted on the fuselage. The length of each anti-collision bar is longer than a half wheelbase of the fuselage by K centimeters, and a spring mechanism is mounted inside an end of the anti-collision bar. The telescopic range of the spring mechanism mounted inside the end of the anti-collision bar is 0-K centimeters, and the counter is attached to record telescopic data of the spring mechanism.

Optionally, the first virtual force is a repulsive force $F_{w-v}$ of the inner wall of the underground space to the underground space UAV, and a formula for calculating the first virtual force is shown in formula (2) as follows:

$$F_{w-v} = \frac{\delta}{[d(v,w)]^2}, \quad (2)$$

where δ is a coefficient of a virtual repulsive force Fw-v, d(v,w) means the distance between the UAV and the inner wall of the underground space, and d(v,w) is read based on the electronic telescopic anti-collision bars.

S104: When the communication result is a success, read, by the underground space UAV, the counter for the electronic telescopic anti-collision bars of the UAV to obtain the distance between the UAV and the inner wall of the underground space, calculate, by the underground space UAV, the first virtual force based on the distance between the UAV and the inner wall of the underground space, calculate a second virtual force based on the sensor perception probability, aggregate the data of the fixed sensors to obtain SSK, and calculate a third virtual force based on the SSK; and input the first virtual force, the second virtual force and the third virtual force into the virtual force-guided path planning algorithm to obtain a second output result, and use, by the underground space UAV, a fixed node-guided UAV flight detection mode for the underground space based on the second output result.

Optionally, the second virtual force is a virtual repulsive force $F_{s-v}$ based on a static perception probability, a higher static perception probability indicates a greater virtual repulsive force, a direction of the second virtual force $F_{s-v}$ points from the position of the fixed node of the sensor to a position of a moving point, and a formula for calculating the second virtual force is shown in formula (3) as follows:

$$\begin{cases} F_{s-v} = \frac{\phi_r}{[1+\alpha d(s,v)]^\beta}, & \text{if } d(s,v) \le r \\ 0, & \text{if } d(s,v) > r \end{cases} \quad (3)$$

where $\varphi_r$ is a virtual repulsive force coefficient $F_{s-v}$, d(s,v) represents a distance between the fixed sensor s and a mobile node v, α and β are device parameters representing physical characteristics of the sensor, and r is a perception radius of the sensor.

The point s where the sensor is located is the position of the fixed sensor referred to during calculation, and a moving point v is the position where the UAV is during detection by the UAV.

Optionally, the third virtual force is a virtual gravitational force $F_{k-v}$ based on the SSK, and a formula for calculating the third virtual force is shown in formula (4) as follows:

$$F_{k-v} = f(SSK) \quad (4).$$

Figure 6:
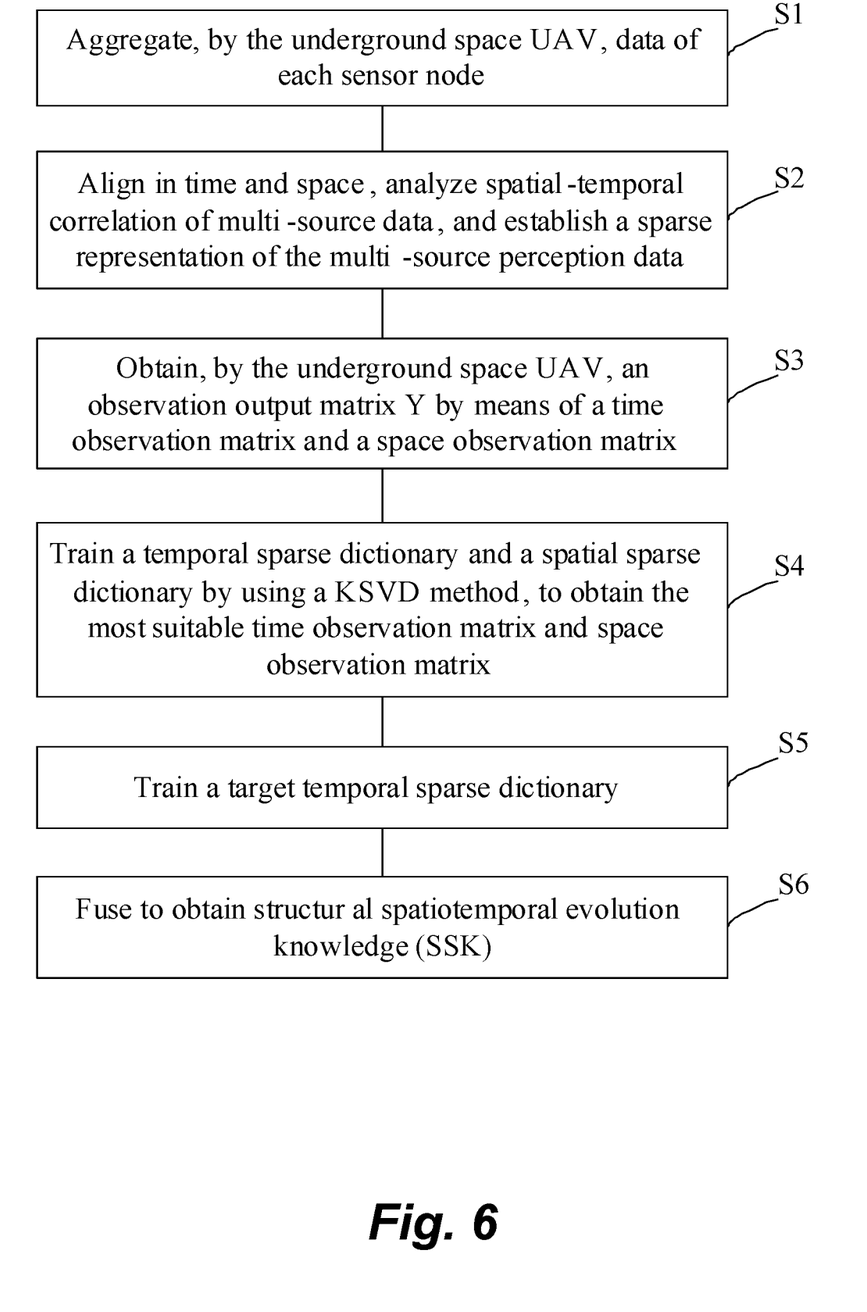
FIG. 6 is a flowchart showing aggregation of data of fixed sensor nodes by an underground space UAV according to an embodiment of the present disclosure.

Optionally, as shown in FIG. 6, the aggregating the data of the fixed sensors to obtain SSK includes the following steps.

S91: When there are sensor nodes in a communication distance range of the underground space UAV, aggregate, by the underground space UAV, data of each sensor node based on the mobile/fixed star topology to obtain an original perception data set S.

S92: Align the multi-sensor node data in time and space, analyze spatial-temporal correlation of the multi-source data, and establish a sparse representation of the multi-source perception data.

S93: Introduce a time observation matrix $\Phi_t$ and a space observation matrix $\Phi_s$ to fuse the original perception data set S, $S=\Psi_t XX\Psi_s^T$, $Y=\Phi_t S\Phi_s^T$, where $\Psi_t, \Psi_s \in R^{Q \times W}$ is a temporal sparse dictionary, $\Psi_s, \Psi_s \in R^{N \times N}$ is a spatial sparse dictionary, and $XX \in R^{W \times N}$ is a sparse coefficient matrix; and obtaining, by the underground space UAV, an observation output matrix $YY \in R^{P \times M}$ by means of the time observation matrix $\Phi_t$ and the space observation matrix $\Phi_s$.

S94: Select a reasonable time observation matrix $\Phi_t$ and space observation matrix $\Phi_s$ to minimize sparsity, and train the temporal sparse dictionary $\Psi_t$ and the space observation matrix $\Psi_s$ by using a K-means singular value decomposition (KSVD) method, to obtain the most suitable time observation matrix $\Phi_t$ and space observation matrix $\Phi_s$.

S95: Let $S_t = \Psi_t X$, and training a target temporal sparse dictionary $\hat{\Psi}_t$, with a training target function shown in formula (5) as follows:

$$\min \|S_t - \hat{\Psi}_t X\|_F^2, s.t. \|x_i\|_0 \le k, i=1,2,\ldots,N \quad (5),\text{ and}$$

update each column of the temporal sparse dictionary, where the updated $i^{th}$ column is expressed as $\widehat{\psi}_{t_i}$, i=1, 2, ..., W, and W is a number of columns of the temporal sparse dictionary, with a formula shown in formula (6) as follows:

$$\|S_t - \hat{\Psi}_t X\|_F^2 = \|S_t - \Sigma_{j=1}^W \widehat{\psi}_{t_j} x_j^T\|_F^2 = \|S_t - \Sigma_{j \ne i} \widehat{\psi}_{t_j} x_j^T - \widehat{\psi}_{t_i} x_i^T\|_F^2 = \|Z_t - \widehat{\psi}_{t_i} x_i^T\|_F^2 \quad (6).$$

S96: Fuse an updated temporal sparse dictionary with the original data set to obtain a fusion result which is the SSK.

The present disclosure provides the detection method for an underground space by joint use of fixed sensors and UAV movement detection, which makes up for the limitation on a space perceived by fixed sensors through movement and autonomous detection of the UAV, and correlates research results in terms of multi-agent cooperative detection, data fusion and target cognition through mutual guidance, collaboration and fusion of the fixed sensors and the UAV, thus improving the multi-sensor detection capability to a certain extent and realizing efficient detection of the underground space by joint use of fixed sensors and UAV movement detection.

Figure 7:
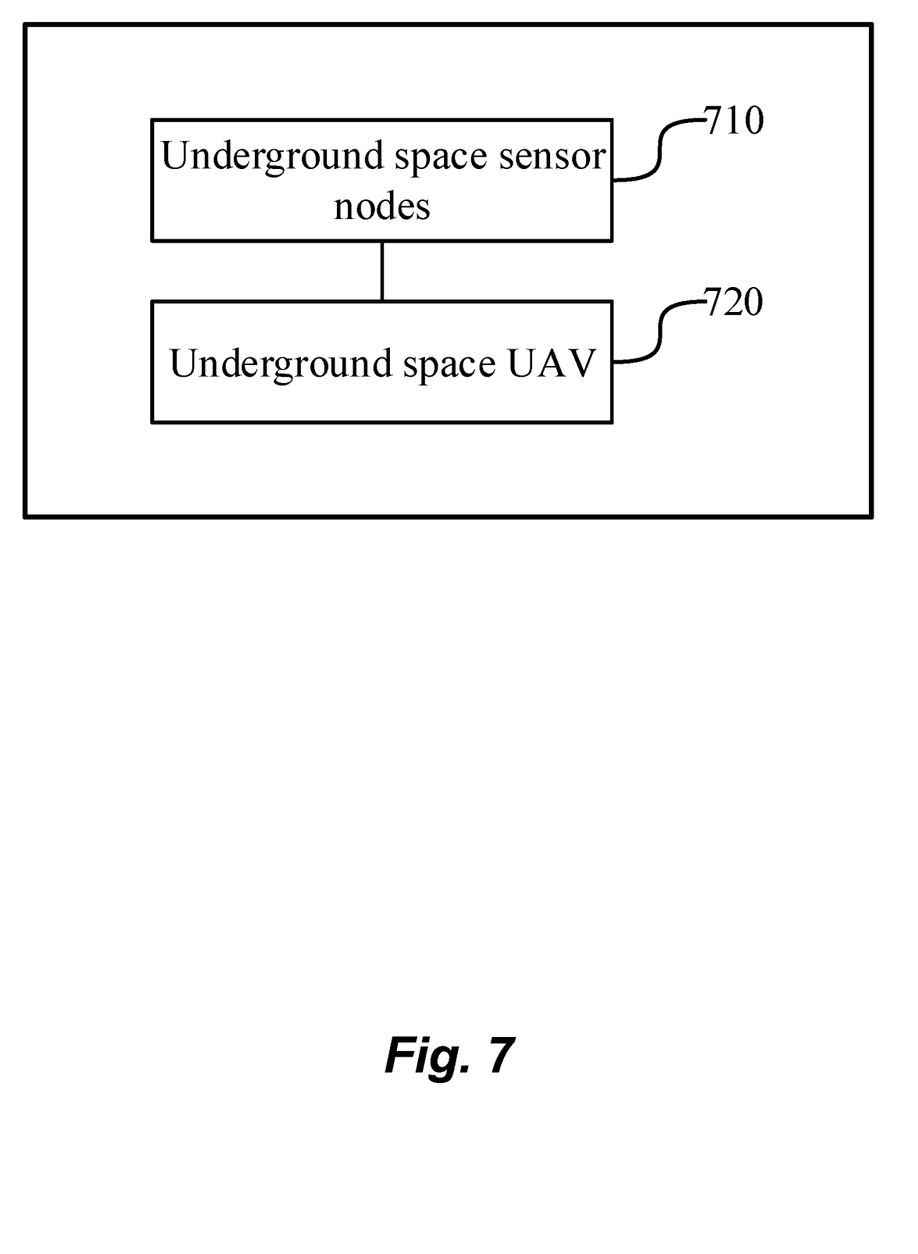
FIG. 7 is a block diagram of a detection system for an underground space by joint use of fixed sensors and UAV movement detection according to an embodiment of the present disclosure.

FIG. 7 is a block diagram of a detection system for an underground space by joint use of fixed sensors and UAV movement detection according to an exemplary example. The system is applied to implement a detection method for an underground space by joint use of fixed sensors and UAV movement detection. Referring to FIG. 7, the system includes underground space sensor nodes and an underground space UAV.

The underground space sensor nodes are configured to collect data to obtain data of fixed sensors, use a fixed monitoring mode for the underground space based on the data of the fixed sensors, and calculate a sensor perception probability.

The underground space UAV is configured to perform communication operation of a mobile/fixed star topology on one or more sensor nodes to determine a communication result; when the communication result is a failure, the underground space UAV is configured to read a counter for electronic telescopic anti-collision bars of the UAV to obtain a distance between the UAV and an inner wall of the underground space, the underground space UAV is configured to calculate a first virtual force based on the distance between the UAV and the inner wall of the underground space, and input the first virtual force into a virtual force-guided path planning algorithm to obtain a first output result, and the underground space UAV is configured to use a movement detection mode for the underground space based on the first output result; when the communication result is a success, the underground space UAV is configured to read the counter for the electronic telescopic anti-collision bars of the UAV to obtain the distance between the UAV and the inner wall of the underground space, and the underground space UAV is configured to calculate the first virtual force based on the distance between the UAV and the inner wall of the underground space, calculate a second virtual force based on the sensor perception probability, aggregate the data of the fixed sensors to obtain structural spatiotemporal evolution knowledge (SSK), and calculate a third virtual force based on the SSK; and the first virtual force, the second virtual force and the third virtual force are input into the virtual force-guided path planning algorithm to obtain a second output result, and the underground space UAV is configured to use a fixed node-guided UAV flight detection mode for the underground space based on the second output result.

Optionally, the underground space sensor nodes are further configured to
use an adaptive optimal layout strategy for an underground structural space to design perception regions, and establish an optimal coverage objective function of the underground structural space to realize multi-sensor adaptive optimal layout for the underground structural space.

Optionally, the underground space sensor nodes are further configured for the following:
the sensor perception probability is an output result after sensor position information is input into a static multi-sensor perception probability model established based on a perception space disk criterion, the sensor perception probability being 1 indicates that a distance between a position of a fixed node of a sensor and a position of a monitoring point is 0, and the sensor perception probability gradually decreases as the distance between the monitoring point and the sensor increases; the perception disk criterion is a static multi-sensor perception region analysis method based on perception characteristics of distributed sensors to analyze overlap, contact, and separation between multiple perception regions, and a formula for calculating the sensor perception probability is shown in formula (1) as follows:

$$\begin{cases} S(s, p) = 1/[1 + \alpha d(s, p)]^\beta & \text{if } d(s, p) \le r \\ S(s, p) = 0 & \text{if } d(s, p) > r \end{cases} \quad (1)$$

where S(s,p) represents a calculated perception probability of a sensor s at a point p, d(s,p) represents a distance between the sensor s and the point p, $\alpha$ and $\beta$ are device parameters representing physical characteristics of the sensor, and r is a perception radius of the sensor.

Optionally, the underground space UAV is further configured for the following:
the first virtual force is a repulsive force $F_{w\text{-}v}$ of the inner wall of the underground space to the underground space UAV, and a formula for calculating the first virtual force is shown in formula (2) as follows:

$$F_{w-v} = \frac{\delta}{[d(v, w)]^2}, \quad (2)$$

where $\delta$ is a coefficient of a virtual repulsive force Fw-v, d(v,w) means the distance between the UAV and the inner wall of the underground space, and d(v,w) is read based on the electronic telescopic anti-collision bars.

Optionally, the underground space UAV is further configured for the following:
the second virtual force is a virtual repulsive force $F_{s\text{-}v}$ based on a static perception probability, a higher static perception probability indicates a greater virtual repulsive force, a direction of the second virtual force $F_{s\text{-}v}$ points from the position of the fixed node of the sensor to a position of a moving point, and a formula for calculating the second virtual force is shown in formula (3) as follows:

$$\begin{cases} F_{s-v} = \frac{\phi_r}{[1 + \alpha d(s, v)]^\beta}, & \text{if } d(s, v) \le r \\ 0, & \text{if } d(s, v) > r \end{cases} \quad (3)$$

where $\phi_r$ is a virtual repulsive force coefficient $F_{s\text{-}v}$, d(s,v) represents a distance between the fixed sensor s and a mobile node v, $\alpha$ and $\beta$ are device parameters representing physical characteristics of the sensor, and r is a perception radius of the sensor.

Optionally, the underground space UAV is further configured for the following:
the third virtual force is a virtual gravitational force $F_{k\text{-}v}$ based on the SSK, and a formula for calculating the third virtual force is shown in formula (4) as follows:

$$F_{k-v} = f(SSK) \quad (4).$$

Optionally, the underground space UAV is further configured for the following:
the mobile/fixed star topology is formed with the underground space UAV as a central node and underground space sensors as sub-nodes; and
that the underground space UAV is configured to perform communication operation of a mobile/fixed star topology on one or more sensor nodes includes:
communicating in a ZigBee low-power wireless communication mode, recording, when the underground space UAV receives a connection requirement, a number of a currently connected node, breaking away from an original topology, switching to the mobile/fixed star topology, and performing self-organizing connection with a sensor clustering self-organizing network; and when the underground space UAV communication connection is unsuccessful, waiting for a next monitoring cycle to continue sending a connection application until the connection is successful.

Optionally, the underground space UAV is further configured to
implement three types of underground space collision avoidance flights based on task-oriented path planning and the virtual force-guided path planning algorithm, where
the three types of underground space collision avoidance flights include passive collision avoidance, active collision avoidance, and active/passive collision avoidance, where the passive collision avoidance is guided by the underground space UAV based on the first virtual force, the active collision avoidance is guided by the underground space UAV based on the second virtual force and the third virtual force, and the active/passive collision avoidance is guided by the underground space UAV based on the first virtual force, the second virtual force, and the third virtual force; and the virtual force-guided path planning algorithm is an algorithm for calculating a magnitude and direction of a virtual resultant force on the underground space UAV based on the designed first virtual force, second virtual force and third virtual force, to obtain a global virtual force distribution when the underground space UAV moves in the underground space.

Optionally, the underground space UAV is further configured to aggregate the data of the fixed sensors to obtain SSK, including the following steps.

S91: When there are sensor nodes in a communication distance range of the underground space UAV, aggregate, by the underground space UAV, data of each sensor node based on the mobile/fixed star topology to obtain an original perception data set S.

S92: Align the multi-sensor node data in time and space, analyze spatial-temporal correlation of the multi-source data, and establish a sparse representation of the multi-source perception data.

S93: Introduce a time observation matrix $\Phi_t$ and a space observation matrix $\Phi_s$ to fuse the original perception data set S, $S=\Psi_t X \Psi_s^T$, $Y=\Phi_t S \Phi_s^T$, where $\Psi_t, \Psi_t \in R^{Q \times W}$ is a temporal sparse dictionary, $\Psi_s, \Psi_s \in R^{N \times N}$ is a spatial sparse dictionary, and $XX \in R^{W \times N}$ is a sparse coefficient matrix; and obtaining, by the underground space UAV, an observation output matrix $YY \in R^{P \times M}$ by means of the time observation matrix $\Phi_t$ and the space observation matrix $\Phi_s$.

S94: Select a reasonable time observation matrix $\Phi_t$ and space observation matrix $\Phi_s$ to minimize sparsity, and train the temporal sparse dictionary $\Psi_t$ and the space observation matrix $\Psi_s$ by using a K-means singular value decomposition (KSVD) method, to obtain the most suitable time observation matrix $\Phi_t$ and space observation matrix $\Phi_s$.

S95: Let $S_t=\Psi_t X$, and train a target temporal sparse dictionary $\hat{\Psi}_t$ with a training target function shown in formula (5) as follows:

$$\min \|S_t - \hat{\Psi}_t X\|_F^2, s.t. \|x_i\|_0 \leq k, i=1,2,\ldots,N \quad (5),\text{ and}$$

update each column of the temporal sparse dictionary, where the updated $i^{th}$ column is expressed as $\widehat{\psi}_{t_i}$, $i=1, 2, \ldots, W$, and W is a number of columns of the temporal sparse dictionary, with a formula shown in formula (6) as follows:

$$\|S_t-\hat{\Psi}_t X\|_F^2 = \|S_t - \Sigma_{j=1}^W \widehat{\psi}_{t_j} x_j^T\|_F^2 = \|S_t - \Sigma_{j \neq i} \widehat{\psi}_{t_j} x_j^T - \widehat{\psi}_{t_i} x_i^T\|_F^2 = \|Z_i - \widehat{\psi}_{t_i} x_i^T\|_F^2 \quad (6).$$

S96: Fuse an updated temporal sparse dictionary with the original data set to obtain a fusion result which is the SSK.

The present disclosure provides the detection method for an underground space by joint use of fixed sensors and UAV movement detection, which makes up for the limitation on a space perceived by fixed sensors through movement and autonomous detection of the UAV, and correlates research results in terms of multi-agent cooperative detection, data fusion and target cognition through mutual guidance, collaboration and fusion of the fixed sensors and the UAV, thus improving the multi-sensor detection capability to a certain extent and realizing efficient detection of the underground space by joint use of fixed sensors and UAV movement detection.

Figure 8:
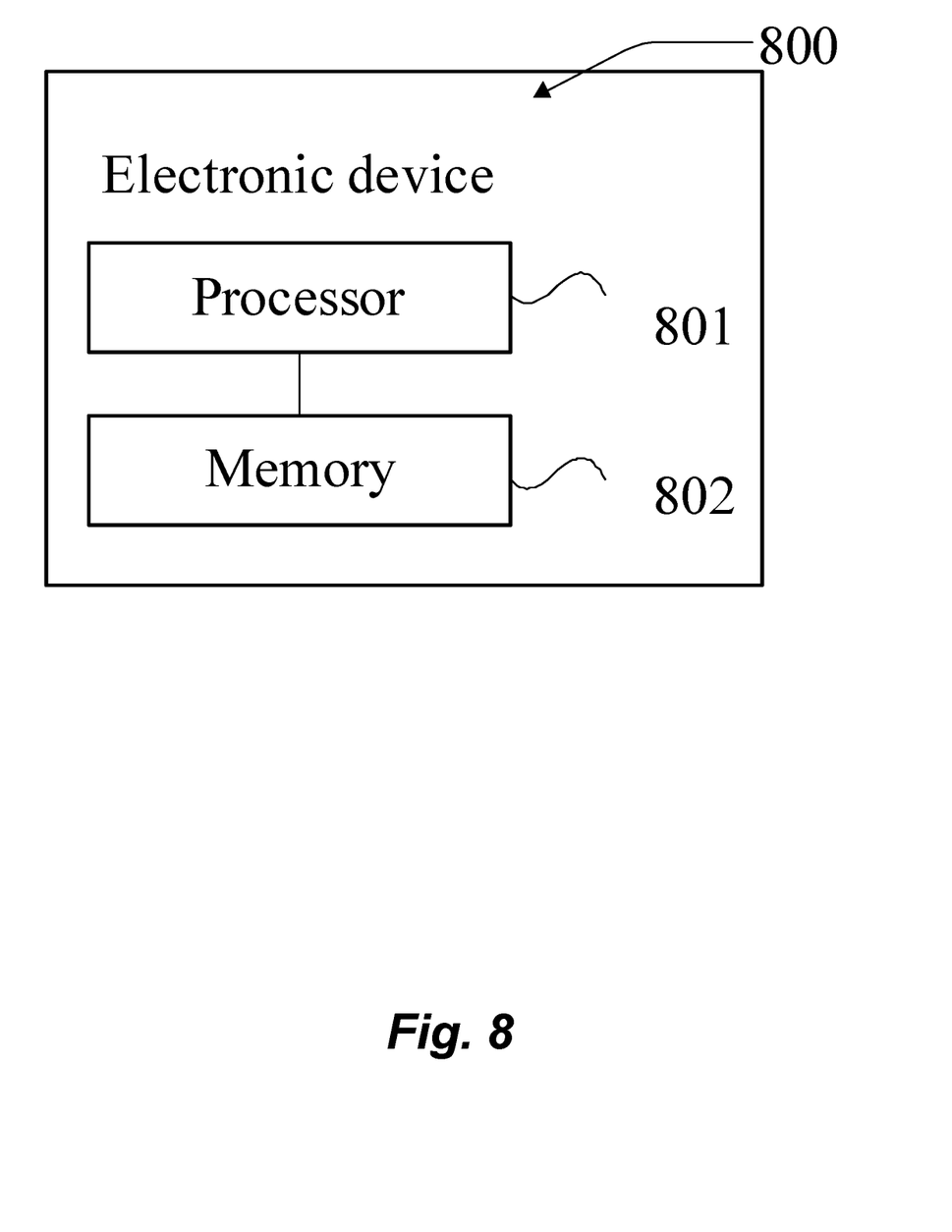
FIG. 8 is a schematic structural diagram of an electronic device according to an embodiment of the present disclosure.

FIG. 8 is a schematic structural diagram of an electronic device 800 according to an embodiment of the present disclosure. The electronic device 800 may vary greatly due to different configurations or performances, and may include one or more processors (central processing units (CPUs)) 801 and one or more memories 802. At least one instruction is stored in the memory 802. The at least one instruction is loaded and executed by the processor 801 to implement the steps of the detection method for an underground space by joint use of fixed sensors and UAV movement detection described above.

In an exemplary embodiment, a computer-readable storage medium, such as a memory including instructions, is further provided, and the above instructions can be executed by a processor in a terminal to complete the detection method for an underground space by joint use of fixed sensors and UAV movement detection described above. For example, the computer-readable storage medium may be a read only memory (ROM), a random access memory (RAM), a compact disc-read-only memory (CD-ROM), a magnetic tape, a floppy disk, an optical data storage device, or the like.

Those of ordinary skill in the art can understand that all or some of the steps in the foregoing embodiments may be implemented by hardware, or by instructing related hardware by using a program. The program may be stored in a computer-readable storage medium. The storage medium described above may be a read only memory, a disk, a compact disc, or the like.

The above are merely preferred embodiments of the present disclosure, and are not intended to limit the present disclosure. Any modifications, equivalent replacements, improvements, and the like made within the spirit and principle of the present disclosure shall fall within the protection scope of the present disclosure.

What is claimed is:

1. A detection method for an underground space by joint use of fixed sensors and unmanned aerial vehicle (UAV) movement detection, which is implemented by a detection system for an underground space by joint use of fixed sensors and UAV movement detection that comprises underground space sensor nodes and an underground space UAV, wherein the detection method comprises:

collecting data by the underground space sensor nodes to obtain data of fixed sensors, using a fixed monitoring mode for the underground space based on the data of the fixed sensors, and calculating a sensor perception probability;

performing, by the underground space UAV, communication operation of a mobile/fixed star topology on one or more sensor nodes to determine a communication result; and when the communication result is a failure, reading, by the underground space UAV, a counter for electronic telescopic anti-collision bars of the UAV to obtain a distance between the UAV and an inner wall of the underground space, calculating, by the underground space UAV, a first virtual force based on the distance between the UAV and the inner wall of the underground space, inputting the first virtual force into a virtual force-guided path planning algorithm to obtain a first output result, and using, by the underground space UAV, a movement detection mode for the underground space based on the first output result; when the communication result is a success, reading, by the underground space UAV, the counter for the electronic telescopic anti-collision bars of the UAV to obtain the distance between the UAV and the inner wall of the underground space, calculating, by the underground space UAV, the first virtual force based on the distance between the UAV and the inner wall of the underground space, calculating a second virtual force based on the sensor perception probability, aggregating the data of the fixed sensors to obtain structural spatiotemporal evolution knowledge (SSK), and calculating a third virtual force based on the SSK; and inputting the first virtual force, the second virtual force and the third virtual force into the virtual force-guided path planning algorithm to obtain a second output result, and using, by the underground space UAV, a fixed node-guided UAV flight detection mode for the underground space based on the second output result;

wherein the first virtual force is a repulsive force $F_{w-v}$ of the inner wall of the underground space to the underground space UAV, and a formula for calculating the first virtual force is shown in formula (2) as follows:

$$F_{w-v} = \frac{\delta}{[d(v,w)]^2}, \quad (2)$$

wherein $\delta$ is a coefficient of a virtual repulsive force $F_{w-v}$, $d(v, w)$ means the distance between the UAV and the inner wall of the underground space, and $d(v, w)$ is read based on the electronic telescopic anti-collision bars.

2. The detection method for an underground space by joint use of fixed sensors and UAV movement detection according to claim 1, wherein the underground space sensor nodes use an adaptive optimal layout strategy for an underground structural space to design perception regions, and establish an optimal coverage objective function of the underground structural space to realize multi-sensor adaptive optimal layout for the underground structural space.

3. The detection method for an underground space by joint use of fixed sensors and UAV movement detection according to claim 1, wherein the sensor perception probability is an output result after sensor position information is input into a static multi-sensor perception probability model established based on a perception space disk criterion, the sensor perception probability being 1 indicates that a distance between a position of a fixed node of a sensor and a position of a monitoring point is 0, and the sensor perception probability gradually decreases as the distance between the monitoring point and the sensor increases; the perception disk criterion is a static multi-sensor perception region analysis method based on perception characteristics of distributed sensors to analyze overlap, contact, and separation between multiple perception regions, and a formula for calculating the sensor perception probability is shown in formula (1) as follows:

$$\begin{cases} S(s, p) = 1/[1 + \alpha d(s, p)]^\beta & \text{if } d(s, p) \le r \\ S(s, p) = 0 & \text{if } d(s, p) > r \end{cases}, \quad (1)$$

wherein $S(s,p)$ represents a calculated perception probability of a sensor s at a point p, $d(s,p)$ represents a distance between the sensor s and the point p, $\alpha$ and $\beta$ are device parameters representing physical characteristics of the sensor, and r is a perception radius of the sensor.

4. The detection method for an underground space by joint use of fixed sensors and UAV movement detection according to claim 1, wherein the second virtual force is a virtual repulsive force $F_{s-v}$ based on a static perception probability, a higher static perception probability indicates a greater virtual repulsive force, a direction of the second virtual force $F_{s-v}$ points from the position of the fixed node of the sensor to a position of a moving point, and a formula for calculating the second virtual force is shown in formula (3) as follows:

$$\begin{cases} F_{s-v} = \frac{\phi_r}{[1 + \alpha d(s, v)]^\beta}, & \text{if } d(s, v) \le r \\ 0, & \text{if } d(s, v) > r \end{cases} \quad (3)$$

wherein $\phi_r$ is a virtual repulsive force coefficient $F_{s-v}$, $d(s,v)$ represents a distance between the fixed sensor s and a mobile node v, $\alpha$ and $\beta$ are device parameters representing physical characteristics of the sensor, and r is a perception radius of the sensor.

5. The detection method for an underground space by joint use of fixed sensors and UAV movement detection according to claim 1, wherein the third virtual force is a virtual gravitational force $F_{k-v}$, based on the SSK, and a formula for calculating the third virtual force is shown in formula (4) as follows:

$$F_{k-v} = f(SSK) \quad (4).$$

6. The detection method for an underground space by joint use of fixed sensors and UAV movement detection according to claim 1, wherein the mobile/fixed star topology is formed with the underground space UAV as a central node and underground space sensors as sub-nodes; and the performing, by the underground space UAV, communication operation of a mobile/fixed star topology on one or more sensor nodes comprises:

communicating in a ZigBee low-power wireless communication mode, recording, when the underground space UAV receives a connection requirement, a number of a currently connected node, breaking away from an original topology, switching to the mobile/fixed star topology, and performing self-organizing connection with a sensor clustering self-organizing network; and when the underground space UAV communication connection is unsuccessful, waiting for a next monitoring cycle to continue sending a connection application until the connection is successful.

7. The detection method for an underground space by joint use of fixed sensors and UAV movement detection according to claim 1, further comprising:

implementing, by the underground space UAV, three types of underground space collision avoidance flights based on task-oriented path planning and the virtual force-guided path planning algorithm, wherein the three types of underground space collision avoidance flights comprise passive collision avoidance, active collision avoidance, and active/passive collision avoidance, wherein the passive collision avoidance is guided by the underground space UAV based on the first virtual force, the active collision avoidance is guided by the underground space UAV based on the second virtual force and the third virtual force, and the active/passive collision avoidance is guided by the underground space UAV based on the first virtual force, the second virtual force, and the third virtual force; and the virtual force-guided path planning algorithm is an algorithm for calculating a magnitude and direction of a virtual resultant force on the underground space UAV based on the designed first virtual force, second virtual force and third virtual force, to obtain a global virtual force distribution when the underground space UAV moves in the underground space.

8. The detection method for an underground space by joint use of fixed sensors and UAV movement detection according to claim 1, wherein the aggregating the data of the fixed sensors to obtain SSK comprises:

S91: when there are sensor nodes in a communication distance range of the underground space UAV, aggregating, by the underground space UAV, data of each sensor node based on the mobile/fixed star topology to obtain an original perception data set S;

S92: aligning the multi-sensor node data in time and space, analyzing spatial-temporal correlation of the multi-source data, and establishing a sparse representation of the multi-source perception data;

S93: introducing a time observation matrix $\Phi_t$ and a space observation matrix $\Phi_s$ to fuse the original perception data set S, $S=\Psi_t X \Psi_s^T$, $Y=\Phi_t S \Phi_s^T$, where $\Psi_t, \Psi_t \in R^{Q \times W}$ is a temporal sparse dictionary, $\Psi_s, \Psi_s \in R^{N \times N}$ is a spatial sparse dictionary, and $XX \in R^{W \times N}$ is a sparse coefficient matrix; and obtaining, by the underground space UAV, an observation output matrix $YY \in R^{P \times M}$ by means of the time observation matrix $\Phi_t$ and the space observation matrix $\Phi_s$;

S94: selecting a reasonable time observation matrix $\Phi_t$ and space observation matrix $\Phi_s$ to minimize sparsity, and training the temporal sparse dictionary $\Psi_t$ and the space observation matrix $\Psi_s$ by using a K-means singular value decomposition (KSVD) method, to obtain the most suitable time observation matrix $\Phi_t$ and space observation matrix $\Phi_s$;

S95: letting $S_t = \Psi_t X$ and training a target temporal sparse dictionary $\Psi_t$, with a training target function shown in formula (5) as follows:

$$\min \|S_t - \hat{\Psi}_t X\|_F^2, s.t. \|x_i\|_0 \le k,\ i=1,2,\ldots,N \quad (5), \text{and}$$

updating each column of the temporal sparse dictionary, where the updated $i^{th}$ column is expressed as $\widehat{\psi}_{t_i}$, $i=1, 2, \ldots, W$, and W is a number of columns of the temporal sparse dictionary, with a formula shown in formula (6) as follows:

$$\|S_t - \hat{\Psi}_t X\|_F^2 = \|S_t - \Sigma_{j=1}^W \widehat{\psi}_{t_j} x_j^T\|_F^2 = \|S_t - \Sigma_{j \ne i} \widehat{\psi}_{t_j} x_j^T - \widehat{\psi}_{t_i} x_i^T\|_F^2 = \|Z_t - \widehat{\psi}_{t_i} x_i^T\|_F^2; \quad (6); \text{and}$$

S96: fusing an updated temporal sparse dictionary with the original data set to obtain a fusion result which is the SSK.

9. A detection system for an underground space by joint use of fixed sensors and UAV movement detection, which is configured to implement a detection method for an underground space by joint use of fixed sensors and UAV movement detection, comprising underground space sensor nodes and an underground space UAV, wherein the underground space sensor nodes are configured to collect data to obtain data of fixed sensors, use a fixed monitoring mode for the underground space based on the data of the fixed sensors, and calculate a sensor perception probability; and the underground space UAV is configured to perform communication operation of a mobile/fixed star topology on one or more underground space sensor nodes in the underground space to determine a communication result; when the communication result is a failure, the underground space UAV is configured to obtain a first virtual force based on reading of data of a counter for electronic telescopic anti-collision bars of the UAV, and input the first virtual force into a virtual force-guided path planning algorithm to obtain a first output result, and the underground space UAV is configured to use a movement detection mode for the underground space based on the first output result; when the communication result is a success, the underground space UAV is configured to obtain the first virtual force based on the reading of the data of the counter for the electronic telescopic anti-collision bars of the UAV, calculate a second virtual force based on the sensor perception probability, aggregate the data of the fixed sensors to obtain structural spatiotemporal evolution knowledge (SSK), and calculate a third virtual force based on the SSK; and the first virtual force, the second virtual force and the third virtual force are input into the virtual force-guided path planning algorithm to obtain a second output result, and the underground space UAV is configured to use a fixed node-guided UAV flight detection mode for the underground space based on the second output result;

wherein the first virtual force is a repulsive force $F_{w-v}$ of the inner wall of the underground space to the underground space UAV, and a formula for calculating the first virtual force is shown in formula (2) as follows:

$$F_{w-v} = \frac{\delta}{[d(v, w)]^2}, \quad (2)$$

wherein $\delta$ is a coefficient of a virtual repulsive force $F_{w-v}$, $d(v, w)$ means a distance between the UAV and the inner wall of the underground space, and $d(v, w)$ is read based on the electronic telescopic anti-collision bars.

* * * * *